Feb. 2, 1943.  R. H. CHURCHILL  2,309,933
COVER
Filed June 20, 1941  2 Sheets-Sheet 1
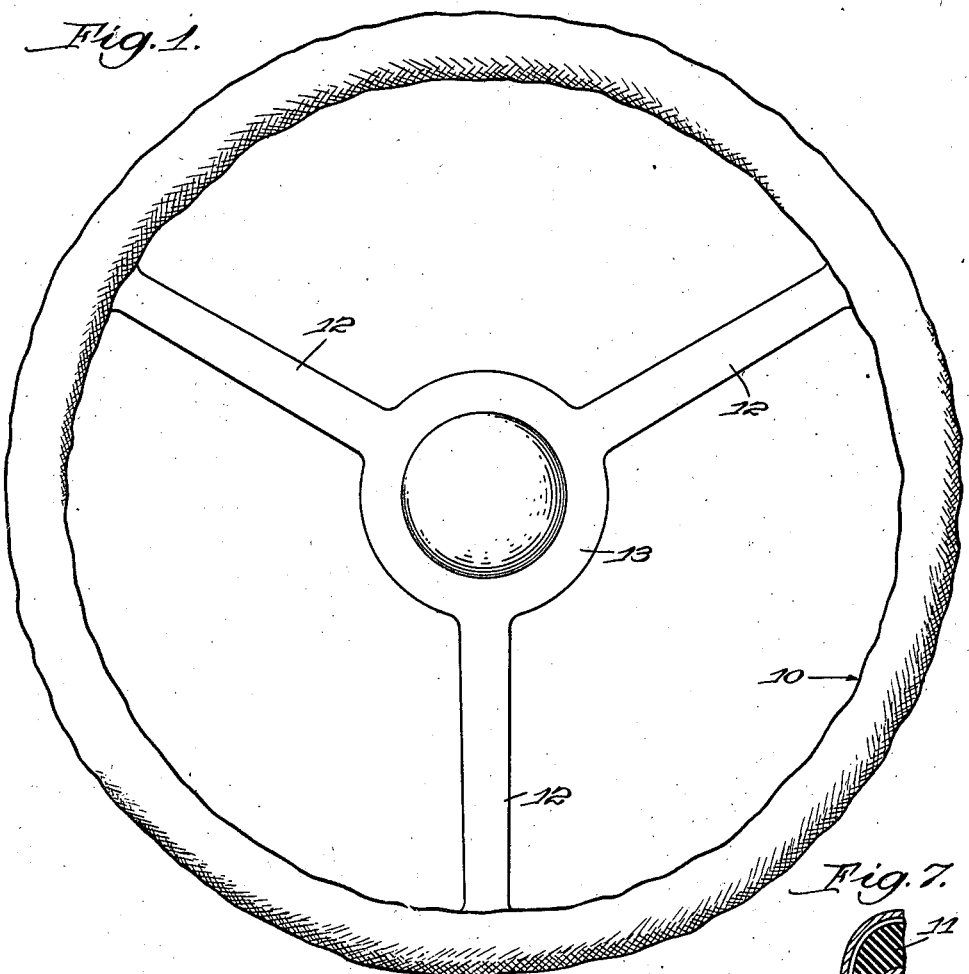
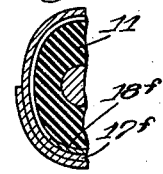
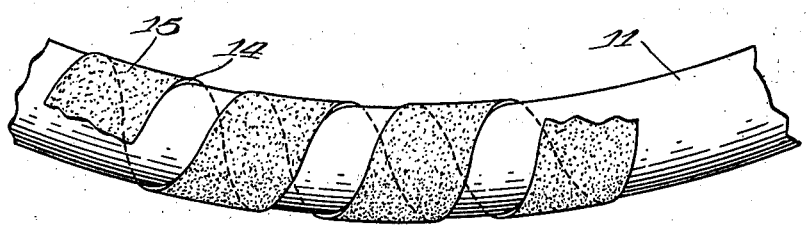
Inventor:
Ralph H. Churchill.
By Shutton, Wiles, Davis & Hirschl.
Attys.

Feb. 2, 1943. R. H. CHURCHILL 2,309,933
COVER
Filed June 20, 1941 2 Sheets-Sheet 2
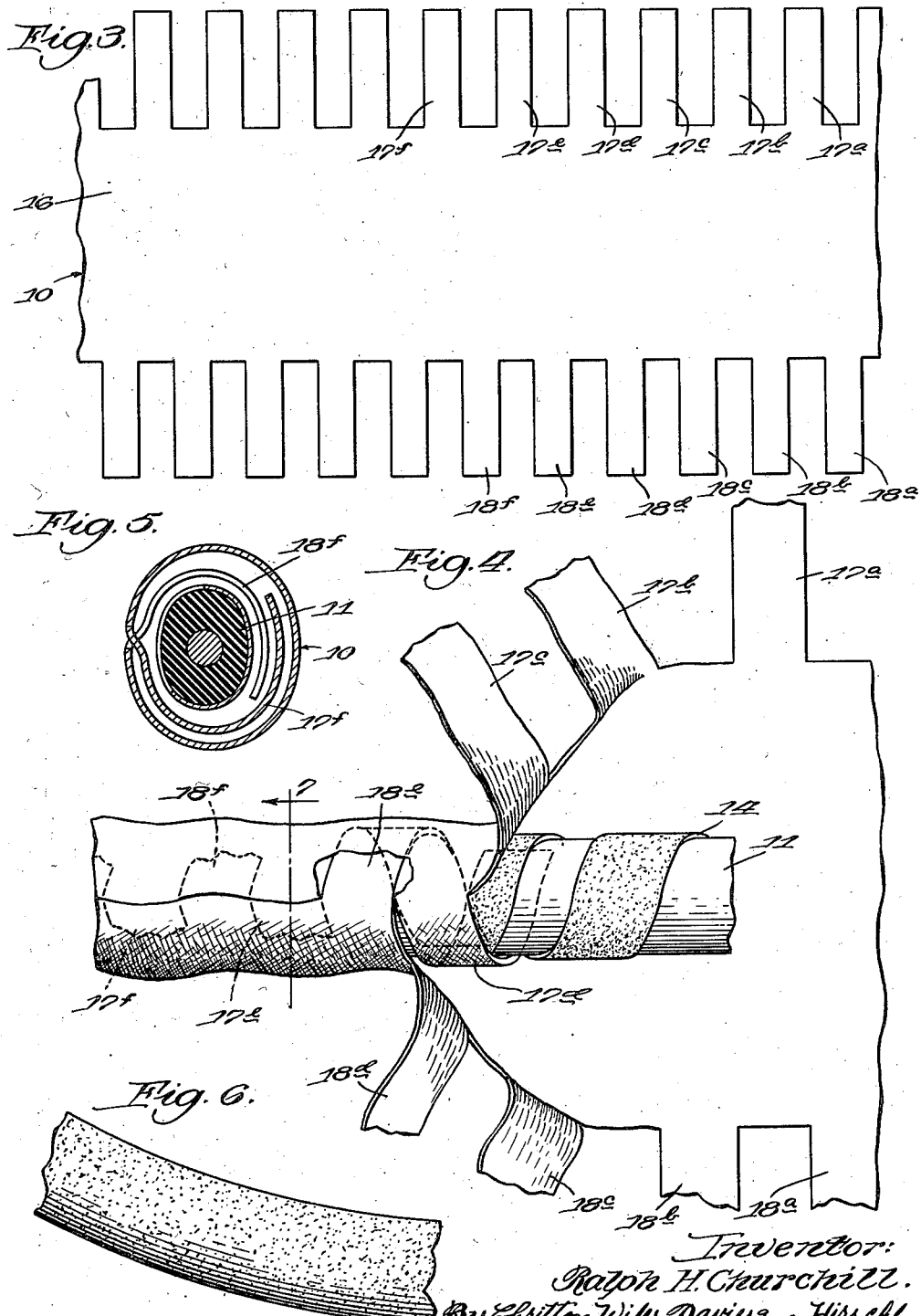

Patented Feb. 2, 1943

2,309,933

UNITED STATES PATENT OFFICE 2,309,933

COVER

Ralph H. Churchill, Chicago, Ill.

Application June 20, 1941, Serial No. 399,004

5 Claims. (Cl. 74—558)

This invention relates to a cover, and more especially to a particular type of cover held in desired position on an element adapted to be gripped by the hands.

One feature of this invention is that it provides a cover which completely encloses the gripped element, as a steering wheel, without leaving uncovered portions; another feature of this invention is that the cover may be readily and conveniently placed on any kind of a gripped element; a further feature of this invention is that the cover may be readily removed and replaced as often as desired, as for washing; yet another feature of this invention is that the cover snugly conforms to a wheel or other arcuate element, without any extending edges or rims; other features and advantages will be apparent from the following specification and the drawings, in which:

Figure 1 is a plan view of a wheel having thereon a cover embodying my invention; Figure 2 is a broken-away view of a portion of the wheel with the cover removed but having a tape arranged helically thereon; Figure 3 is a plan view of a portion of my cover in flat extended position; Figure 4 is a fragmentary view showing the manner in which my cover is applied to a wheel; Figure 5 is a diagrammatic transverse view through a section of the wheel and cover; Figure 6 is a fragmentary view of another form of wheel adapted to be used with my cover; and Figure 7 is a fragmentary transverse view of a section of the wheel and cover.

It has long been recognized that covers are desirable for elements intended to be gripped by the hands, as the steering wheel of an automobile, the control wheel or stick of an airplane, a baseball bat, or the like. Covers of a material which has very low heat conductivity are an advantage in winter in that they keep the hands warmer; and in the summer in that they tend to keep the hands ventilated and to prevent slippage of sweat-moistened palms. The covers also have the advantage in preventing slipping in the winter, since gloves will grip a knit or woven material cover better than a hard rubber or similar wheel. Accordingly, it will be seen that a cover keeps the hands more comfortable all the year around, warmer in the winter and cooler in the summer, and tends to prevent slipping of the hands when the element gripped thereby is being moved.

While wheel covers of the kind heretofore used have received some commercial acceptance, they have not gone into the widespread usage that would be indicated by their advantages. This is because all previous wheel covers have had defects and objects which in most cases overbalanced their advantages. Some wheel covers have had to be sewed or laced in position on the wheel, a long process, and even then they slipped with respect to the wheel; other covers have been glued or cemented in place on the wheel, but except for the kind of cover sold by applicant and disclosed in his Patent No. 2,078,059, such covers have been practically impossible to remove and wash once they have been placed on the wheel. Other covers have been in the form of a band with heavy rubbers or springs along the edge, dependence being placed on these to hold the cover in the desired position on the wheel, the interior of the cover sometimes being coated with rubber to help in this regard. Such covers, however, have left a considerable open space on the inside of the wheel, and the edges of the band have stuck out away from the wheel and tended to interfere with the fingers as the wheel was gripped. Moreover, practically all of the previous conventional types of wheel covers have tended to twist under the hands, as well as to slip peripherally around the wheel.

I have overcome these and other objections to previous wheel covers and provide a wheel cover which is easy to place on and remove from a wheel, which can be of washable material without any adhesive on it, yet which completely covers the wheel in a snug fit and does not slip in any direction during use of the wheel. While I speak of "wheel" throughout this application, it will be understood that this does not necessarily imply a completely circular wheel, but any arcuate control member adapted to be gripped by the hands; and that my invention is being described in connection with a wheel merely for clarity of illustration, it being adapted for use with any element of substantial cross section adapted to be gripped by the hand or hands.

In the particular embodiment of my invention illustrated herewith I have shown my invention embodied in a cover for an automobile steering wheel. The cover, which is indicated in general as 10, overlies the wheel proper indicated as 11, supported in conventional manner by spokes 12 radiating from the central hub 13. In order to secure the proper combination between my cover and the wheel, the wheel is preferably provided with a roughened exterior surface. It is not sufficient that this surface be merely undulatory; it must be so highly roughened as to catch and hold material which lies in close association with it. That is, the roughened surface is preferably provided by such substance as sand, or by cutting the wheel in the same manner in which a file is cut, so that a wheel cover of knitted or woven fabric will catch this roughened surface and remain in place without slippage. One convenient and readily usable way of providing the desired roughened surface portions of a conventional automobile steering wheel is to wind such wheel helically with tape 14, as shown in Figure 2. It will be understood that this tape has a body portion with adhesive on one surface and with sand or similar catchy abrasive particles 15 on the other surface. The tape would be wound on the wheel with the rough surface to the outside, of course, and the helix should be reasonably tight so that there is never more than about half an inch or so of smooth surface between the roughened surfaces provided by the tape. If the wheel is prepared initially for use with such a cover as I am here disclosing it may be provided during manufacture with a cut surface, or a sand or similar abrasive surface coating applied all over it, as shown in Figure 6.

My wheel cover itself is of flexible material, as knitted or woven material. I have found that knitted material is preferable to other forms because it has greater ability to stretch into the desired shape conforming to the wheel, and because it catches and holds much better on a roughened surface than a tightly woven fabric. As can be best seen in Figure 3, my cover comprises a main band-like body portion 16 and spaced tab-like portions extending laterally and alternately from each side of the body portion, the tab-like portions on one side of the body portion 16 being here indicated by the numeral 17 and those on the other side by the numeral 18. The band-like body portion should have a width approximately equal to that of the circumference of a section of the wheel on which it is to be used, preferably a little less than such circumference; and the tab-like portions should have a length less than this circumference and a width less than their length. For a conventional automobile steering wheel the body portion of my cover would be formed in an annular band preferably slightly smaller than the wheel, so that it is stretched when it is placed thereon in order to insure better conformance of the cover to the steering wheel. I have found that, for a conventional automobile steering wheel, the tab-like portions should preferably have a length between an inch and an inch and one-half and a width of about one-half inch, the spacing between tabs also being about one-half inch.

As can be seen from Figure 3, the tabs on opposite sides of the body portion alternate; that is, the tabs on one side are opposite the spaces between tabs on the other side of the body portion. Not only is this important to the proper application of my cover to a wheel, but it is highly desirable in that it enables the tabs to be readily formed integral with the body portion by conventional knitting machinery. A rack knitter, for example, can be set to knit rows four inches long and so arranged as to traverse back and forth at intervals a distance equal to the desired length of the tabs, say one and one-half inches. Describing the formation of a knit cover in connection with its position as shown in Figure 3, the rack knitter could knit four or five rows forming a part of the body portion and the tab 18a; then it would traverse up (to the other side) and knit a further part of the body portion and the tab 17a; and then traverse back to its original position to knit more of the body portion and the tab 18b. It will be readily seen that this enables the tabs to be knit integrally with the body portion at high speed.

In applying the cover to the wheel, the wheel would first have some roughened exterior surface provided, as by the tape 14. The annular band-like body portion would then be slipped around the outside of the wheel, the stretch causing it to conform to the wheel sufficiently to partially retain its position during the remaining steps. The alternate tabs (first one side and then the other) are laid around the wheel helically and the opposite side of the body portion brought over them before the next tab is laid around the wheel. That is, the user would merely hold one side of the body portion away from the wheel and lay the tab on the other side around it, then lay the edge of the body portion over such tab and lay the next succeeding tab on such side around the wheel in the opposite direction, bringing the other side of the body portion over this, and so on. As may be seen in Figure 4, the tab 18e has just been laid around the wheel in one direction and covered with the other side of the body portion, and the tab 17d laid around the wheel in the opposite direction. This would next be covered by the lower side of the body portion (speaking with respect to Figure 4) and the tab 18d laid around the wheel, and so forth. This makes a very easy and convenient way of applying the cover to the wheel, and the tabs grip the roughened surfaces sufficiently to keep them in place when they are overlaid by the body portion. The result is a complete coverage of the wheel, with no open places or protruding bare edges; the cover is caught and held by the roughened surface, so that it does not move with respect to the wheel during usage; yet it can be easily removed, washed and replaced conveniently any number of times. In order to better understand the position of the parts as they are laid over each other, reference may be had to Figures 5 and 7 in addition to Figure 4. Figure 5 represents a diagrammatic, expanded showing; while Figure 7 is a true partial section along the line 7 of Figure 4. As may be best seen in the diagrammatic showing of Figure 5, the tab 18f, which was laid around the wheel 11 in a clockwise direction (speaking with respect to Figure 5), is covered over by the upper edge of the body portion of the cover and then the tab 17f laid around the wheel in a counter-clockwise direction.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A combination of the character described, including: a wheel; a tape having one side adapted to adhere to the wheel and another side providing a roughened exterior; and a cover adapted to encircle the wheel, the cover being of flexible material and comprising a band-like body portion and spaced tab-like portions extending laterally therefrom.

2. A combination of the character described, including: a wheel; a tape having one side adapted to adhere to the wheel and another side providing a roughened exterior; and a cover adapted to encircle the wheel, the cover being of flexible material and comprising a band-like body portion having a width approximately equal to the circumference of a section of the wheel on which it is to be used and equally spaced tab-like portions extending laterally and alternately from each side of the body portion, the tab-like portions having a length less than said circumference and a width less than their length, the spacing between tabs being approximately equal to their width.

3. A combination of the character claimed in claim 2, wherein the material is knitted and the tab-like portions are integral with the body portion.

4. A combination of the character described, including: a wheel; a tape having one side adapted to adhere to the wheel and another side providing a roughened exterior; and a cover adapted to encircle the wheel, the cover comprising a band-like body portion of flexible material and means for holding the material in snug engagement with said roughened exterior.

5. A combination of the character claimed in claim 4, wherein said material is knitted or woven fabric.

RALPH H. CHURCHILL.